United States Patent [19]

Plamper et al.

[11] 4,364,735
[45] Dec. 21, 1982

[54] COMBINED TORQUE CONVERTER AND CLUTCH

[75] Inventors: Gerhard R. Plamper, Valley City; Paul R. Fortlage, Brunswick; Hans-Hartmut Kaesgen, Berea, all of Ohio

[73] Assignee: MTD Products Inc., Cleveland, Ohio

[21] Appl. No.: 931,767

[22] Filed: Aug. 7, 1978

[51] Int. Cl.³ .............................................. F16H 55/52
[52] U.S. Cl. .......................................... 474/14; 474/8; 474/13; 474/46
[58] Field of Search .................... 192/105 B, 105 BA; 74/230.17 E, 230.17 M, 230.17 B, 230.17 R, 230.17 C, 230.24

[56] References Cited

U.S. PATENT DOCUMENTS

| 2,260,795 | 10/1941 | Burns | 74/230.17 M |
|---|---|---|---|
| 2,612,054 | 9/1952 | Davis | 74/230.17 |
| 2,623,400 | 12/1952 | Davis | 74/230.17 |
| 2,709,372 | 5/1955 | Melone | 74/230.17 E |
| 2,928,286 | 3/1960 | Davis | 74/230.17 C |
| 3,362,242 | 1/1968 | Watkins | 74/230.17 E |
| 3,625,079 | 12/1971 | Hoff | 74/230.17 |
| 3,709,052 | 1/1973 | Lassanske | 192/105 B X |
| 3,727,476 | 4/1973 | Heidorn | 74/230.17 C |
| 3,808,900 | 5/1974 | Vadeboncoeur et al. | 74/230.17 E |
| 3,986,406 | 10/1976 | Prasad | 74/230.17 E |

FOREIGN PATENT DOCUMENTS

| 214222 | 1/1958 | Australia | 74/230.24 |
|---|---|---|---|
| 449439 | 6/1948 | Canada | 192/105 B |
| 425382 | 2/1926 | Fed. Rep. of Germany | 74/230.24 |
| 615125 | 11/1926 | Fed. Rep. of Germany | 192/105 BA |
| 960066 | 3/1957 | Fed. Rep. of Germany | 74/230.17 E |
| 1176423 | 8/1964 | Fed. Rep. of Germany | 192/105 BA |
| 1045919 | 12/1953 | France | 74/230.17 E |
| 1078160 | 11/1954 | France | 74/230.17 C |
| 1078765 | 11/1954 | France | 74/230.17 C |
| 1169487 | 12/1958 | France | 74/230.17 E |
| 283380 | 1/1928 | United Kingdom | 192/105 B |

Primary Examiner—Leslie A. Braun
Attorney, Agent, or Firm—Woodling, Krost & Rust

[57] ABSTRACT

A torque converter with a clutch mechanism in combination wherein an axially movable sheave is movable toward and away from an opposed fixed sheave, the sheaves accomodating a belt therebetween, the movable sheave being movable in accordance with movement of a centrifugal speed responsive device adjacent the movable sheave to vary the effective pitch diameter of the pair of sheaves having their opposed faces engageable by the belt, and in which a clutch mechanism axially aligned with and mounted on the torque converter is actuatable to move the movable sheave from a non-driving position wherein the belt is not in driving engagement with the sheaves to a driving position wherein the belt is in driving engagement with the sheaves, the sheaves being resiliently biased axially apart and the clutch mechanism being resiliently biased away from the movable sheave.

20 Claims, 4 Drawing Figures

COMBINED TORQUE CONVERTER AND CLUTCH

BACKGROUND OF THE INVENTION

An object of our invention is to provide an efficient combination of torque converter and clutch mechanism particularly adapted for control of the operation of the torque converter.

Another object is the provision of a compact construction of a torque converter and clutch mechanism mounted in axial alignment with each other and wherein the clutch mechanism operates on the torque converter to change it between non-operative and operative conditions.

Another object is the provision of an improved torque converter changeable between a non-drivable condition and a drivable condition by a clutch mechanism mounted on, and disposed in axial alignment with, the torque converter.

Another object is the provision of an improved combination of torque converter and clutch mechanism adapted for mounting on the frame of a vehicle such as a motor drivable bicycle or moped.

Another object is the provision for changing the condition of a torque converter to vary it from non-driving engagement with a belt between the sheaves of the converter to driving engagement of both the sheaves with the belt.

A still further object is the provision for an improved efficient and dependable centrifugal speed reponsive device in a torque converter.

Other objects and a fuller understanding of our invention may be had by referring to the following description of a preferred form of our invention and claims, taken in conjunction with the accompanying drawings in which:

Our invention relates to torque converters of the general kind shown in prior U.S. Pat. No. 2,612,054; No. 2,623,400; No. 2,709,372; No. 2,928,286; and No. 3,625,079; wherein the effective pulley diameter of a pair of mating sheaves accomodating a belt between then is varied by a centrifugal speed reponsive device. The torque converter made in accordance with our invention is an improvement over that shown in those patents and over any other known converters. Our invention also encompasses a unique combination of a clutch mechanism mounted on the converter in axial alignment with the converter.

Figure 1:
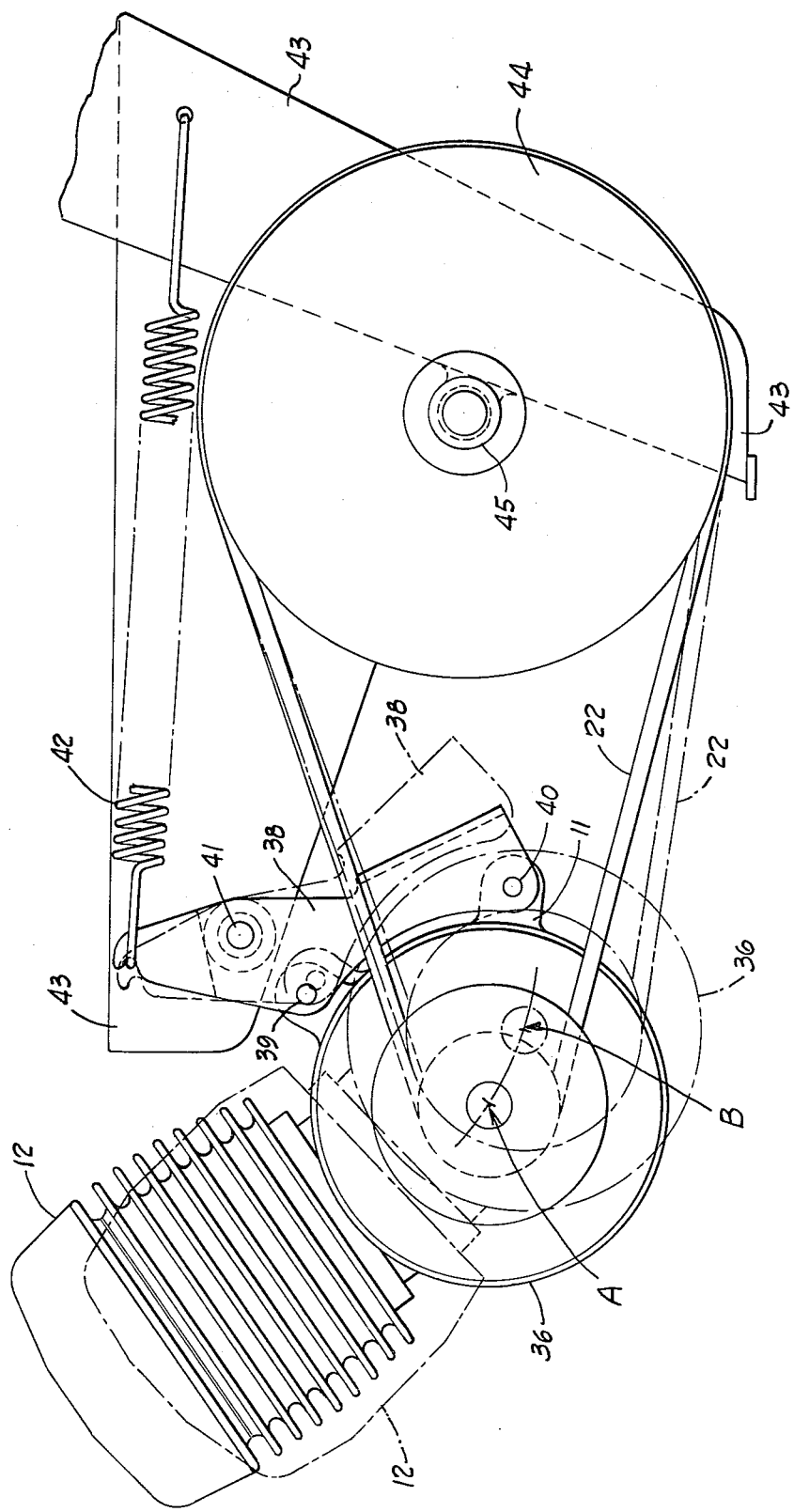
FIG. 1 is a side view of our combined torque converter and clutch mechanism mounted on a frame, as for example on a frame of a motor drivable bicycle or moped.

In FIG. 1 of our drawings there is shown our improved torque converter and clutch mounted upon a frame of a vehicle such as a moped or motor driven bicycle. Only a supporting portion of the frame is illustrated. The housing of the torque converter designated by the reference character 11 has a motor or engine 12 mounted thereon so that both of the converter housing and motor move together. The housing 11 has two spaced connecting mounting portions, which are connected to a bracket 38, which bracket 38 in turn, is pivotally mounted by a pivotal connection 41 to a part of the frame 43.

The pivotal connection 41 provides that the combined torque converter housing 11 and engine 12 may swing in an arc about the axis of the pivotal connection 41. The weight of the converter and engine tends to swing the converter and engine downwardly. A long expansion spring 42 is connected at one end to the upper end portion of the bracket 38 and at the other end to the frame 43 as seen in FIG. 1. The bias of the spring 42 is such as to oppose the downward thrust by force of gravity on the converter and engine as they tend to swing in an arc about pivot connection 41.

Figure 2:
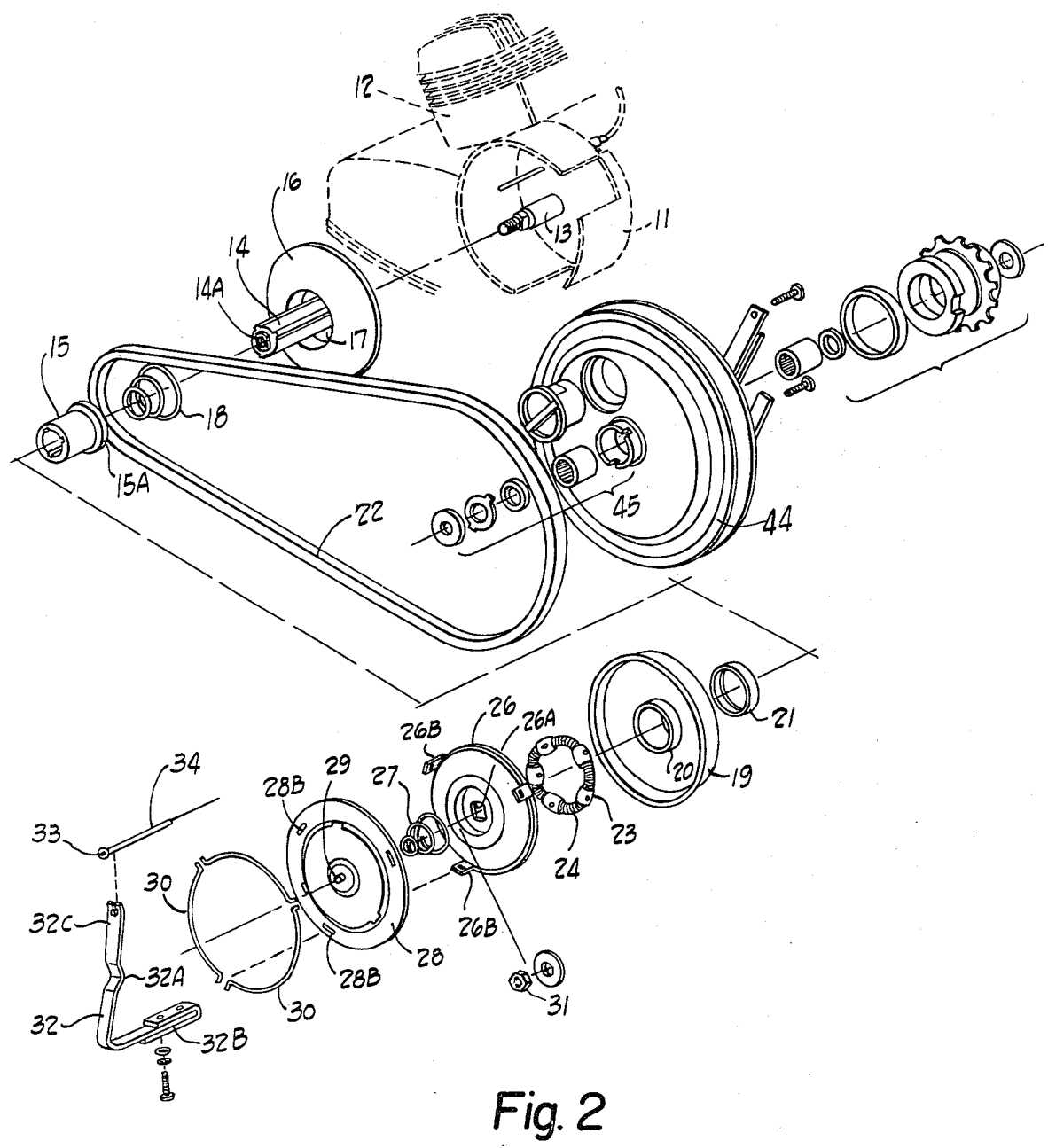
FIG. 2 is an exploded view of our combined torque converter and clutch mechanism showing the parts in spaced relationship prior to assembly.
Figure 3:
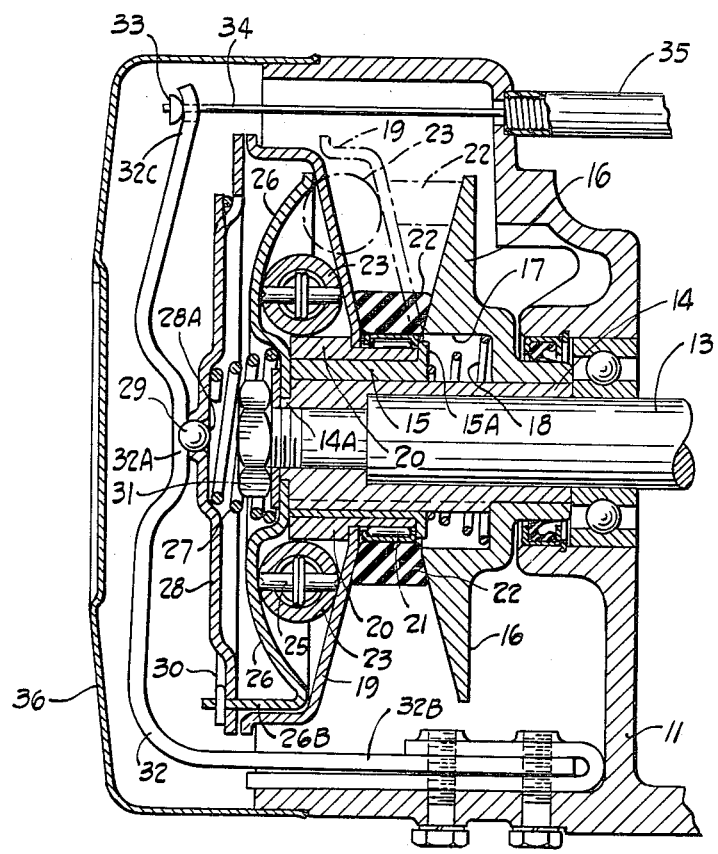
FIG. 3 is an enlarged cross-sectional view of our combined torque converter and clutch mechanism showing details of construction.

As better seen in FIGS. 2 and 3, which is a cross-sectional view, the converter housing 11 is in axial alignment with an engine shaft 13. This engine shaft 13 is so connected to the engine as to be rotated by the engine and also to crank the engine upon rotation of the shaft 13 through external means. The disposition of the converter and associated parts is best shown in the detailed view of FIG. 3 and the exploded view of FIG. 2.

Splined to the free or outer end of the engine shaft 13 is a converter shaft 14 so that both converter shaft 14 and engine shaft 13 rotate together. Mounted upon the converter shaft 14, is a hub 15 which may slide axially along the converter shaft 14, but is so splined therewith that the hub 15 and the converter shaft 14 rotate together. The hub 15 has a flange 15A that its one end is better seen in FIG. 3. The thickness of this flange 15A determines the permissable extent of axial travel of the hub 15 along the converter shaft 14. By adding to the thickness of the flange 15A or by adding annular washers so as to effectively thicken the flange 15A, the limits of the axial movement of hub 15 may be extended and fixed.

Splined to the converter shaft 14 is a fixed sheave 16. The fixed sheave 16 rotates with the converter shaft 14 and is also secured so that it does not axially move along the converter shaft 14. It is to be noted that the fixed sheave 16 has a central recess 17 formed therein as shown in FIG. 3. A compression spring 18 is disposed within the recess 17 and around the converter shaft 14. The spring 18 is in a spiral form so that its smaller end abuts the flange 15A and the larger end abuts the fixed sheave 16. The bias of the spring 18 is such as to resiliently urge the hub 15 away from the fixed sheave 16.

A movable sheave 19 carried on a central hub portion 20 secured thereto is mounted upon the hub 15 so that the movable sheave 19 rotates with the hub 15 through a splined interconnection between the central hub portion 20 and the hub 15. The movable sheave 19 mounted on central hub portion 20 and hub 15 are movable axially toward and away from the fixed sheave 16. In the non-driving condition of the converter the movable sheave 19 is in the position shown in solid lines in FIG. 3. In one of the driving conditions of a converter, the movable sheave 19 is in the position shown in broken lines in FIG. 3.

An endless belt 22 is reeved around the pair of sheaves 16 and 19 so as to be disposed between the opposed faces of two sheaves. The other bight of the endless belt 22 is reeved around a pulley 44 which is carried by a bearing mounting assembly 45 on the frame 43. As seen in FIG. 3, the non-driving condition of the converter, the belt 22 is somewhat spaced from the movable sheave 19 so as to be out of the engagement therewith. To facilitate the revolving of the belt 22 while in this non-driving condition, there is provided a needle bearing assembly 21. This needle bearing assembly 21 permits the easy running of the belt freely between the sheaves when the movable sheave 19 is in its retracted position illustrated in solid lines of FIG. 3.

A concave plate member 26 is mounted on the outer free end of the converter shaft 14. The plate 26 has a non-round opening 26A, which interfits with the non-round end 14A of the converter shaft 14, whereby the plate 26 rotates with the converter shaft 14 and the parts carried thereby. A nut 31 associated with a washer adjacent thereto presses against the plate 26 and holds all of the parts carried by the converter shaft 14 together.

It is to be noted that between the concave plate 26 and movable sheave 19 there is an annular space. This annular space is relatively wide near the axis of the converter and is relatively narrow at a radial distance outwardly as the parts are shown in solid lines in FIG. 3.

Figure 4:
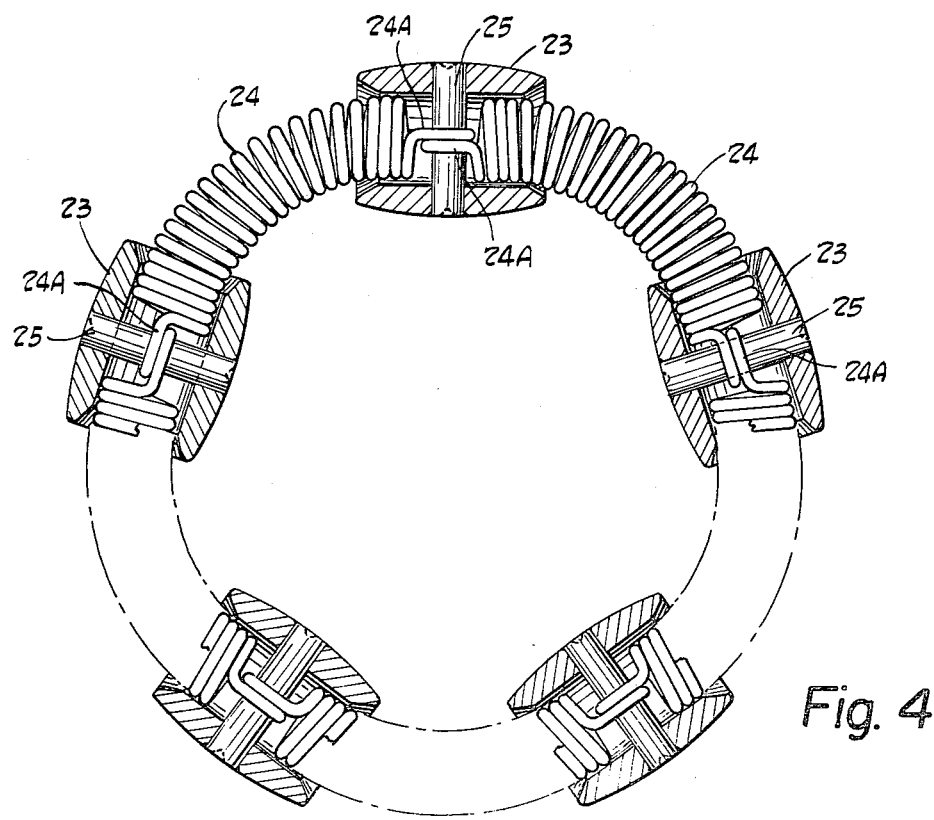
FIG. 4 is an enlarge plan view of the improved centrifugal speed responsive device incorporated in our combination torque converter and clutch mechanism.

Disposed within this annular space between plate 26 and sheave 19, is a centrifugal speed reponsive device, which is shown in greater detail in the enlarged view of FIG. 4. This speed responsive device is made up of five weights 23 joined together at their opposite ends by five extension springs 24. The opposite ends of each spring 24 are flattened to form flat loops 24A. A cross-pin 25 inserted through each weight 23 extends through mating flat loops 24A of the springs 24. The pins 25 are in a press fit in the weights 23, and thus the ends of the springs are anchored within a weight 23.

It is to be noted that each weight has a bore or central opening extending therethrough for accomodating the springs 24. There is also to be noted that each weight 23 is somewhat "barrel-shaped" so as to be bulged intermediate the ends of the weight.

This speed responsive device is mounted within the annular space and in a rest position is disposed inwardly in an annular space next to the central hub portion 20. Under high speed conditions centrifugal force causes the weights 23 to move radially outward in the annular space. The springs permit the weights 23 to move radially outward. In one of the positions of the weights 23, as they move outward under the influence of centrifugal force, they are in the position of shown broken lines in FIG. 3.

As the weights move radially outward, they press against the movable sheave 19 and move it axially toward the fixed sheave. For example, upon the weights 23 moving to the position shown by broken lines in FIG. 3, the movable sheave 19 has moved to the position shown in broken lines in FIG. 3. Also, when in this position of the movable sheave, the belt 22 has been moved radially outward between the opposed faces of the two sheaves to the position of the belt shown in broken lines in FIG. 3.

Of course, the weights 23 may be in varied positions between that shown in solid lines and that shown in broken lines in FIG. 3, this depending on the speed of rotation and hence the degree of centrifugal force. Also, the movable sheave may be in varied positions between that shown in solid lines of FIG. 3 and that shown in broken lines of FIG. 3, which variation in position depends upon the variation in the position of the weights 23. Further, as a consequence of the varying positions of the weights 23 in accordance with the centrifugal force imparted thereon, the belt 22 may vary between its position shown in solid lines in FIG. 3 and its position shown in broken lines of FIG. 3. In short, the weights 23, movable sheave 19, and the belt 22 are movable through a number of positions intermediate the extreme positions illustrated in FIG. 3.

A clutch disk 28 is mounted at the free or outer end of the assembly making up the converter. A compression spring 27 is positioned between the plate member 26 and the clutch disk 28, so as to resiliently urge the clutch disk 28 away from the plate member 26 and axially away from the hub 15 and from the sheave 19. The spring 27 is in spiral form and the larger end disposed around the nut 31 abuts against the plate 26. The smaller end of the sprial spring 27 abuts against the clutch disk 28 near the central part thereof. This clutch disk 28 has a central opening 28A formed therein, and in this central opening 28A, there is fixedly mounted a steel ball 29. The mounting is such that pressure against the ball 29 from forwardly of the clutch disk 28, that is from the left side seen in FIG. 3, moves the clutch disk 28 in a axial direction against the bias of spring 27 toward the plate member 26 and the converter shaft 14.

The clutch disk 28 has three equidistantly spaced slots 28B formed therein near its periphery. The plate member 26 has three equally spaced fingers 26B which correspond with the spacing of the three slots 28B. Each finger 26B is inserted through a respective slot 28B. A spring retainer ring 30, made up of three segments, holds the clutch disk 28 to the plate member 26 by means of the ends of the spring segments going through holes in the fingers 26B. The resiliency of the spring 30 is such as to hold the spring to the respective fingers and hence to interlock the clutch disk 28 to the plate member 26 adjacent their respective peripheries.

A resilient actuating member 32, preferably of spring steel, in the form shown in the drawings has an end portion 32B anchored by bolts to a side of the converter housing 11. This actuating member 32 as seen in the drawings extends forwardly and transversely across the front of the clutch disk 28. The actuating member 32 has an abutting portion 32A which is in alignment to engage the ball 29 carried by, and movable with, the clutch disk 28. The resiliency of the actuating member 32 is such that the abutting portion 32A is biased away from the ball 29. However, by swinging the actuating member 32 against the ball 29 the clutch 28 is moved in an axial direction against the bias of member 32 toward the nut 31 at the end of the converter shaft 14.

To move and swing the actuating member 32 against its bias, a flexible cable 34 is connected by means of cable connection 33 to the free end 32C of the actuating member 32. The flexible cable 34 is movable axially by sliding through a sheath 35 upon the pulling of cable 34 to the right as seen in FIG. 3. The free end 32C of the actuating member 32 is swung so as to press the abutting portion 32 against the ball 29 in opposition to the bias of the spring 27. The cable 34 leads to a lever handle (not shown) or other manipulating means mounted upon the frame of the vehicle carrying the converter assembly.

To protect and enclose the contents of the converter housing 11, a cup-shaped casing 36 is mounted upon the free end and open end of housing 11. The casing 36 is held by a snap action by a close fit of the outer lips or end wall of the casing 36 with the outer end of the housing 11.

The pulley 44, around which the belt 22 is reeved, is mounted upon a bearing mounting assembly 45 carried by the frame 43. The pulley 44 is adapted to be engaged with a rotor (not shown) manually driven by the pedals (not shown) activiated by the operator of the vehicle such as a moped or motorized bicycle.

It is to be noted that spring 42 not only opposes the downward thrust by force of gravity on the converter as it tends to swing in an arc about pivot connection 41, but the spring 42 also maintains tension on the belt 22 in all positions of the converter (as in high, low, and intermediate speeds). The resilient force of spring 42 and the resilient force of springs 24 of the speed responsive device are in balanced opposition.

In FIG. 1 the point B identifies the position of the axis of the converter when the parts are in a high speed condition, that is when the belt 22 is moved radially outward between the opposed faces of the sheaves, (such as shown in broken lines in FIG. 3). Point A identifies the position of the axis of the converter while in slow speed condition with the belt moved radially inward, (such as to the position shown in the solid lines in FIG. 3). The sheaves and other parts carried upon the hub 15 of the converter move correspondly toward and away from the pulley 44 as the axis shifts between point A to point B.

It is noted that in the non-driving condition of the converter (as shown in solid lines in FIG. 3), the belt 22 freely rolls on needle bearing assembly 21, and is not in engagement with the opposed faces of the two sheaves and hence the converter is not then drivingly connected through the belt 22 with the pulley 44. In this condition the engine 12 may rotate the shaft 13 and converter assembly but the pulley 44 is not revolved and the vehicle is not driven by the engine 12. If the engine 12 is not operating and it is desired to start or crank the engine 12, then the actuating member 32 is moved by cable 34 so that to move the clutch disk 28 against the sheave 19 which thereupon becomes pressed against the belt 22. The belt 22 upon being pressed by sheave 19 against sheave 16 is in driving interengagement therewith upon manual rotation of pulley 44, such as by the operator pedalling to turn a rotor interengaged with pulley 44, the engine is cranked to start the same. Thus, the clutch disk 28 is used only for starting the engine by manual rotation (such as by pedalling) and by moving the clutch disk axially against the movable sheave long enough to initiate engagement of belt and sheaves.

Upon the speed of the converter assembly increasing the weights 23 axially move the sheave 19 toward the fixed sheave 16 and this causes the belt 22 to move radially outward between the sheaves. This is because of the well-known manner of a "V" being moved outwardly in the v-shaped space between sheaves in a torque converter. Depending upon the rotative speed of the assembly mounted on the shaft 13, the weights 23 move the sheave 19 a corresponding distance. Varying degrees of speed are thus obtainable. The thickness of the flange 15A or of any washer addition thereto to increase its effective thickness determines the degree to which the hub 15 and the movable sheave 19 carried thereby may move toward the fixed sheave 16 and hence the degree to which the belt 22 may move outwardly between the sheaves.

Once the engine is started and operating, the cable 34 may be released and the actuating member 32 allowed to move back by force of spring 27. While the parts are revolving the weights 23 by centrifugal force tends to move outwardly and to keep the movable sheave 19 in firm engagement with the belt 22. This provides the desired driving interconnection between the torque converter and the pulley of the moped. As stated, the faster the converter rotates, the more the weights 23 move outwardly, the more the belt 22 moves outwardly, and the faster the pulley is rotated. At all non-driving or idling positions the belt 22 remains in engagement with needle bearing assembly 21 which rolls around the hub 20.

This combination provides a unique arrangement for starting an engine through clutching a torque converter, mounted on, and connected to, the engine shaft.

Although this invention has been described in its preferred form with a certain degree of particularity, it is understood that the present disclosure of the preferred form had been made only by way of example and that numerous changes in the details of construction and the combination and arrangement of parts may be resorted to without departing from the spirit and the scope of the invention as hereinafter claimed.

What is claimed is:

1. In a variable speed torque converter having a housing and a fixed sheave and an axially opposed movable sheave in the housing, said sheaves being non-rotatively mounted on a converter shaft interengaged with a motor shaft for rotation of the shafts together, said movable sheave being resiliently biased axially away from said fixed sheave, an endless belt reeved about said pair of sheaves for engagement with opposed faces of said sheaves, the belt being reeved about a pulley for driving interengagement of said belt and pulley, the said motor and converter being mounted to maintain tension on said belt, the motor and converter being resiliently biased toward said pulley to yield to said tension, the combination of a plate member in axial alignment with said converter shaft and engaged therewith for rotation with said converter shaft and said sheaves, said plate member and movable sheave having opposed faces defining an annular space therebetween concentric with said converter shaft, a spring-biased weight assembly in circular form disposed in said annular space and concentric with said converter shaft, said spring-biased weight assembly including a plurality of substantially equidistantly spaced weights distributed about said circular form and resilient means connecting said weights, said resilient means biasing said weights radially inwardly in said annular space, said weights under centrifugal force imparted thereto upon rotating of said sheaves and converter shaft being urged radially outwardly in said annular space in oppositions to said resilient means, the opposed faces defining said annular space being so disposed relative to each other that radial outward movement of said weights against said opposed faces forces said movable sheave toward said fixed sheave, a clutch disk in axial alignment with said converter shaft and said sheaves, said clutch disk facing, for interengagement with, said movable sheave to force said movable sheave axially toward said fixed sheave and into engagement with said belt between the sheaves, said clutch disk being resiliently biased axially away from said fixed sheave, said clutch disk having a centrally located engaging portion on a side thereof, an actuating member carried by said housing and extending diagonally across said clutch disk and movable toward and away from said clutch disk, said actuating member having an abutting portion disposed substantially in alignment with said engaging portion of said clutch disk in position to abut the said engaging portion of the clutch disk upon movement of the actuating member toward said clutch disk, said actuating member being resiliently biased away from said clutch disk to urge said abutting portion of the actuating member away from said engaging portion of the clutch disk, and connecting means connected to said actuating member to move the actuating member against the resilient bias imparted thereto toward the clutch disk and to cause the engaging portion of the clutch disk to press the clutch disk axially toward and against the movable sheave to move the same toward the fixed sheave, the spacing between the movable and fixed sheaves being such that in the non-driving position of the converter the movable sheave is out of engagement with the belt, that in low-speed position the movable sheave engages the belt and the belt and sheaves revolve about the axis of the converter, and that in higher-speed positions the movable sheave is moved axially toward the fixed sheave by the weights of the spring-biased weight assembly under centrifugal force moving radially outward in said annular space, the arrangement providing for clutching operation of the torque converter into and out of driving positions and the determination of the driving speed upon the axial spacing of the sheaves relative to each other under the action of the said spring-weight assembly in said annular space.

2. The combination claimed in claim 1 and in which said clutch disk and movable sheave interengage about the peripheral region of the clutch disk and movable sheave, and the plate member is carried by the converter shaft.

3. The combination claimed in claim 1 and in which the movable sheave is carried by a hub member journalled on the converter shaft, the hub member being axially movable relative to said fixed sheave, said hub member being telescopically interengageable with said fixed sheave and accomodating a spring therebetween for resiliently urging the movable sheave away from said fixed sheave, said hub member carrying roller bearings on its outer circumferential portion adapted to provide bearing engagement with a belt between said sheaves while disposed in non-driving position.

4. The combination of a torque converter and a clutch structure, the converter having a fixed sheave and a movable sheave journalled on a converter shaft and disposed to accommodate a driving belt between the sheaves for driving interengagement with the belt, said movable sheave being resiliently biased away from said fixed sheave, the movable sheave being movable away from the fixed sheave to a non-driving position to where the movable sheave does not press the said belt against the fixed sheave to permit revolving of the belt between the sheaves in non-driving engagement with the sheaves, the movable sheave being movable to a low-speed driving position to where the belt is pressed by the movable sheave against the fixed sheave to provide driving interengagement of the belt with said sheaves, the belt in the low-speed driving position of the sheaves being disposed radially inward toward the axis of the converter, the movable sheave, in response to centrifugal-force responsive means, being movable to higher-speed driving positions to where the belt is continued to be pressed by the movable sheave against the fixed sheave to provide continued driving interengagement of the belt with the sheaves, the belt in such higher-speed driving positions being disposed radially outward away from the axis of the converter greater radial distance than the positions of the belt in said low-speed driving positions of the sheaves, a clutch member in axial alignment with said movable sheave, said clutch member being movable independently of said centrifugal-force responsive means and being in position to engage said movable sheave for pressing the clutch member positively against the movable sheave to move the movable sheave directly to said low-speed driving position independently of any movement of the movable sheave by said centifugal-force responsive means, and an actuating member carried by the converter and positioned to engage and move said clutch member against the resilient bias thereof against the clutch member for actuating the clutch member.

5. The combination claimed in claim 4 and including connecting means connected to said actuating member providing for actuation of the actuating member from a distant location, and interengagement means at a location centrally disposed of the clutch member for providing local interengagement between clutch member and actuating member at said location.

6. The combination claimed in claim 4 and including means for permitting said converter to move relative to a pulley for maintaining driving tension on the belt reeved about said converter and said pulley, and means mounting the clutch structure to the converter so that said clutch structure moves with said converter relative to the pulley.

7. The combination of a torque converter having sheaves mounted on a shaft arranged for changing the ratio of driving speeds of a belt positioned between the sheaves by movement of one of the sheaves axially relative to the other sheave, the movable of said sheaves relative to the other of said sheaves being movably responsive to action of centrifugal-force responsive means mounted in said converter, and a clutch structure mounted on the shaft in axial alignment with the sheaves and movable axially thereof prior to movement of the said movable sheave in response to action of said centrifugal-force responsive means for positively pressing the movable of said sheaves into a driving position for driving interengagement with the belt independently of any movement of the movable sheave by the centrifugal-force responsive means, the said clutch structure being biased in an axial direction away from the movable of said sheaves.

8. The combination claimed in claim 7 and in which said clutch structure has an engaging portion disposed at a location axially of the clutch structure, and including an actuating member carried by the converter biased away from the clutch structure and positioned to engage and press the engaging portion of the clutch structure to move the clutch structure against the movable of the sheaves upon movement of the actuating member against the bias thereof.

9. The combination claimed in claim 7 and including first resilient means for biasing the movable of the sheaves axially away from the other of said sheaves, second resilient means for biasing said clutch structure axially away from the said movable of the sheaves, and third resilient means for biasing said actuating member axially away from the said movable of the sheaves.

10. In a torque converter having a shaft, a fixed sheave, an axially movable sheave, a belt between said sheaves for driving interengagement therewith, and a plate member axially disposed relative to the movable sheave, the sheaves and plate member being mounted on a shaft, the plate member being mounted in fixed axial position on the shaft, the plate member and movable sheave between them defining an annular space concentric with the shaft, the annular space progressively decreasing radially outward of the shaft, and a weight and spring assembly positioned in said annular space and disposed relative to said plate member and movable sheave to cause the movable sheave to move axially toward the fixed sheave by the weight and spring assembly being moved radially outward in said annular space under centrifugal force upon revolving about the axis of said shaft, the improvement of a clutch disk mounted on said shaft in axial alignment with said movable sheave, said clutch disk being movable axially of the shaft independently of movement of the movable sheave by the weight and spring assembly, said clutch disk being resiliently biased in an axial direction away from said movable sheave, said clutch disk and said movable sheave having interengageable portions disposed to provide for moving the movable disk toward the fixed sheave upon movement of the clutch disk in opposition to the resilient bias thereof in an axial direction toward the fixed sheave, and an actuating member carried by the converter and resiliently biased in an axial direction away from the fixed sheave, the actuating member being adapted to engage said clutch disk upon movement of the actuating member against the clutch disk in an axial direction toward the fixed sheave, the movement of the clutch disk by the actuating member in an axial direction toward the fixed sheave pressing the movable sheave against the belt between the sheaves for driving the interengagement with both sheaves.

11. The improvement claimed in claim 10, in which said clutch disk has a centrally located engaging portion on a side thereof away from said movable sheave, and in which said actuating member has an abutting portion disposed to face said engaging portion of the clutch disk in axial alignment with said axis, the movement of the actuating member toward the fixed sheave causing the abutting portion of the actuating member to engage the engaging portion of the clutch disk and the movement of the clutch disk toward the movable sheave to press it toward the fixed sheave against the belt.

12. The improvement claimed in claim 10 and in which said interengageable positions are disposed around the peripheral portions of the clutch disk and movable sheave and in a cylindrical phantom radially outward of said plate member to clear the plate member.

13. The improvement claimed in claim 10, and including connecting means connected to the actuating member for moving the actuating member in opposition to the resilient bias thereof from a distant location.

14. The improvement claimed in claim 10, and in which the interengaging portion of the clutch disk is in the form of a protruding part centrally carried by the clutch disk, and in which the interengaging portion of the actuating member is an off-set portion of the actuating member facing the protruding part of the clutch disk to engage and press against the protruding part of the clutch disk upon movement of the actuating member in an axial direction toward the fixed sheave.

15. The combination of a torque converter and a clutch mechanism, the torque converter having a fixed sheave and an axially movable sheave mounted on a shaft and a belt between the sheaves for driving interengagement between the sheaves and belt, the converter including centrifugal-force responsive means positioned to move the said axially movable sheave, the clutch mechanism having a clutch disk carried by the converter in axial alignment with the converter, the clutch disk being resiliently biased in an axial direction away from the fixed sheave and being movable, independently of said centrifugal-force responsive means, against said resilient bias toward the fixed sheave and positively against the movable sheave to press the movable sheave against a belt between the sheaves for driving interengagement of the belt and sheaves independently of any movement of the movable sheave by the centrifugal-force responsive means.

16. The combination claimed in claim 15 in which the movable sheave of the converter is movable in an axial direction toward the fixed sheave by centrifugal-force responsive means, and in which the clutch disk permits the movable sheave to move axially away from the fixed sheave to a location where there is no driving interengagement with the belt, and the centrifugal-force responsive means, after the driving interengagement of the sheaves with the belt, moves the movable sheave sufficiently to force the belt radially outward between the sheaves, and in which the clutch disk, independently of any movement of the movable sheave by said centrifugal-force responsive means, positively presses the movable sheave toward the fixed sheave into driving engagement with said belt for initiating movement of said belt.

17. The combination of a torque converter in which a belt is disposed between a fixed sheave and a movable sheave mounted on a shaft, the movable sheave being axially movable relative to the fixed sheave from a non-driving position retracted from the fixed sheave out of interengagement with said belt and being axially movable relative to the fixed sheave to a driving position in interengagement with said belt for providing interengagement of belt and both sheaves, said torque converter including centrifugal-force responsive means positioned to axially move said movable sheave, and a clutch mechanism having a clutch disk axially aligned with the movable sheave and resiliently biased away from the movable sheave, the clutch disk and facing the movable sheave to engage the movable sheave upon axial movement of the clutch disk in opposition to the resilient bias thereof toward and against the movable sheave, said clutch disk being axially movable independently of the movement of the movable sheave by said centrifugal-force responsive means, said clutch disk being resiliently biased in an axial direction away from said movable sheave, said clutch disk being movable against the movable sheave to positively move the movable sheave toward the fixed sheave independently of any movement of the same by the centrifugal-force responsive means, the clutch mechanism including an actuating member carried by the converter and resiliently biased in an axial direction away from said clutch disk, movement of the actuating member in opposition to the resilient bias thereof against the clutch disk pressing the movable sheave in opposition to the resilient bias thereof in an axial direction against the movable sheave for moving the movable sheave from said non-driving position.

18. In a torque converter having a first sheave movable axially toward and away from a second sheave, the sheaves accomodating a belt therebetween, the converter having an annular space adjacent and concentric with the said first sheave, and centrifugal-force responsive means disposed in said annular space for axially moving the said first sheave in accordance with the rotative speed of the converter, the improvement in said centrifugal-force responsive means of a plurality of separate uniform weights joined together with expansion coil springs, said weights being separated and equidistantly spaced apart by said springs, each of said weights being of general barrel shape, round in cross-section and outwardly bulged in a curve between its axial ends, each of said weights having a central opening extending axially therethrough and a transverse opening extending therethrough from side to side and transversing said central opening, said springs having their opposite end portions protruding into a central opening of a said each weight, and anchoring means in each said transverse opening and carried by each weight and anchoring a spring end portion in the central opening of a weight, the weights and springs alternating with each other and disposed in the form of a ring.

19. The improvement as claimed in claim 18 and in which each spring has formed at its opposite ends a loop disposed in a plane at right angles to a transverse plane through the coils of the springs, and in which the anchoring means in each weight comprises a pin extending through the transverse opening of the said each weight and through the said loops of the two springs extended toward each other into the central opening from the opposite ends of the weight.

20. The improvement as claimed in claim 19 and in which said loops of the two springs extended into the central opening of a said weight are disposed parallel and besides each other, and the said pin extended through and engages the two loops on the the opposite sides of the central opening, and in which the central opening has a cylindrical bore intermediate its ends and a conical lead at the opposite ends of cylindrical bore.

* * * * *